US011617298B2

(12) United States Patent
Ruppert et al.

(10) Patent No.: US 11,617,298 B2
(45) Date of Patent: Apr. 4, 2023

(54) AGRICULTURAL PRODUCT DELIVERY APPLICATOR WITH A PNEUMATIC CONVEYING SYSTEM HAVING A DISTRIBUTOR ASSEMBLY

(71) Applicant: CNH Industrial America LLC, New Holland, PA (US)

(72) Inventors: Rex LeRoy Ruppert, Benson, MN (US); Nicholas R. Pederson, Willmar, MN (US); Charles O'Connell, Willmar, MN (US); Jeffrey Scot Martin, Benson, MN (US); John Paul Honermann, Benson, MN (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 461 days.

(21) Appl. No.: 16/819,858

(22) Filed: Mar. 16, 2020

(65) Prior Publication Data

US 2021/0282312 A1 Sep. 16, 2021

(51) Int. Cl.

| | |
|---|---|
| ***A01C 7/08*** | (2006.01) |
| ***B65G 53/06*** | (2006.01) |
| ***B05B 7/14*** | (2006.01) |
| ***A01C 15/00*** | (2006.01) |
| ***A01M 9/00*** | (2006.01) |

(Continued)

(52) U.S. Cl.
CPC .............. *A01C 7/084* (2013.01); *A01C 7/102* (2013.01); *A01C 15/00* (2013.01); *A01M 9/003* (2013.01); *A01M 9/0092* (2013.01); *B05B 7/1486* (2013.01); *B05B 15/60* (2018.02); *B65G 53/06* (2013.01)

(58) Field of Classification Search
CPC ........... A01C 7/084; A01C 7/081; A01C 7/08; A01C 7/10; A01C 7/102; A01C 15/00; B05B 15/60; B05B 15/00; B05B 7/1486; B05B 7/1481; B05B 7/14; B05B 7/00; A01M 9/003; A01M 9/0092; A01M 9/0007; A01M 9/00; B65G 53/06; B65G 53/04; B65G 53/00
See application file for complete search history.

(56) References Cited

U.S. PATENT DOCUMENTS 4,131,237 A 12/1978 Van der Lely et al.
4,767,062 A 8/1988 Fletcher
4,826,088 A 5/1989 Balmer
(Continued)

*Primary Examiner* — Christopher J. Novosad
(74) *Attorney, Agent, or Firm* — Rebecca Henkel; Rickard DeMille

(57) ABSTRACT

An agricultural product delivery applicator for delivering particulate product to a field. The applicator includes a supply compartment to hold the product and a pneumatic conveying system. The system includes an airflow source to provide an airflow, and a delivery line operably connected to the airflow source and to the supply compartment. The delivery line includes a supply line and a plurality of distribution lines. The system further includes a distributor coupling the supply line with the plurality of distribution lines, a plurality of distributor outlets providing outlet channels for the distributor, and a motor mount disposed away from the aperture along an axis and supported by one or more of the plurality of distributor outlets. A motor is disposed on a delivery lines side of the distributor and fastened to the motor mount.

20 Claims, 9 Drawing Sheets

(51) Int. Cl.
*A01C 7/10* (2006.01)
*B05B 15/60* (2018.01)

(56) References Cited

U.S. PATENT DOCUMENTS

| | | | | |
|---|---|---|---|---|
| 8,656,848 | B2 | 2/2014 | Hubalek et al. | |
| 9,902,571 | B2 | 2/2018 | Hui et al. | |
| 10,306,825 | B2 | 6/2019 | Hui et al. | |
| 2015/0098767 | A1 | 4/2015 | Beaujot et al. | |
| 2016/0095276 | A1 * | 4/2016 | Roberge ................. | A01C 21/00<br>239/654 |
| 2018/0343792 | A1 | 12/2018 | Roberge et al. | |

* cited by examiner

AGRICULTURAL PRODUCT DELIVERY APPLICATOR WITH A PNEUMATIC CONVEYING SYSTEM HAVING A DISTRIBUTOR ASSEMBLY

FIELD OF THE INVENTION

The invention relates generally to an agricultural product delivery system for applying particulate material such as seed, fertilizer, herbicide, or insecticide to a field, and more particularly an agricultural product delivery applicator with a pneumatic conveying system having a distributor assembly.

BACKGROUND OF THE INVENTION

Agricultural product delivery applicators (or systems) are known to utilize various mechanisms, including mechanical and pneumatic systems, to assist in the movement and delivery of particulate material or product. Example product that can be delivered include fertilizer, seed, insecticide, or herbicide. The product can move from a product bin through an interior passage provided by a series of elongate tubes, which extend from the product supply chamber to a product applicator. The applicator places the product on or in growing medium, such as soil. Such agricultural product delivery systems are commonly employed in planters, air drills, fertilizer and pesticide applicators, and a variety of other agricultural implements.

Agricultural application implements that employ an agricultural product delivery applicator are known to have the product supply bin associated with a metering system. The product is metered from the bin into a set of distribution channels for application to the soil. A pneumatic source, such as a fan or blower, provides air to convey and distribute product through the distribution channels. Once the metering of product is done and the mix of air and particulates is in the distribution channels, the product should remain nearly constant and in a diluted phase.

One of the challenges with pneumatic delivery of product is the volume of product that can be spread. When increasing the pressure to move more product, and to move it further, product tends to cling to tube walls. Prior systems, such as disclosed in US Patent Application Publication No. 2018/0343792 A1, the content of which is incorporated herein by reference, disclose a pneumatic conveying system having a horizontal rotary product distributor. The rotary distributor includes a motor and a rotating shaft to divert the particulate material relatively evenly between the delivery nozzles. However, an even further improved apparatus for lifting product off the tube wall and churning the product in order to distribute the product among multiple tubes is desired. Also, an improved means for mounting the motor that moves the agitation arm is desired. Further, an improved means for distributing the product from one tube to multiple tubes is desired.

BRIEF SUMMARY OF THE INVENTION in one aspect, the invention provides an agricultural product delivery applicator for delivering particulate product to a field. The applicator includes a supply compartment to hold the product, and a pneumatic conveying system. The pneumatic conveying system includes an airflow source to provide an airflow, a delivery line operably connected to the airflow source and to the supply compartment, and a distributor. The delivery line includes a supply line and a plurality of distribution lines. The pneumatic conveying system further includes a distributor coupling the supply line with the plurality of distribution lines, a plurality of distributor outlets providing outlet channels for the distributor, and a motor mount disposed away from the aperture along an axis and supported by one or more of the plurality of distributor outlets. Each one of the plurality of distributor outlets is coupled to a respective one of the plurality of distribution lines. The pneumatic conveying system also includes a motor disposed on a delivery lines side of the distributor and fastened to the motor mount, and a shaft assembly rotatable by the motor and including an agitator portion substantially disposed on a supply line side of the distributor. The shaft assembly extends through the aperture of the distributor. The applicator further includes a metering system operably connected between the supply compartment and the pneumatic conveying system. The metering system meters product with the airflow to result in a mixed flow of airflow and product.

In another aspect, the invention provides an agricultural product delivery applicator for delivering particulate product to a field. The applicator includes a supply compartment to hold the product, and a pneumatic conveying system. The pneumatic conveying system includes an airflow source to provide an airflow, a delivery line operably connected to the airflow source and to the supply compartment, and a distributor coupling the supply line with the plurality of distribution lines. The delivery line includes a supply line and a plurality of distribution lines. The distributor including a plurality of wedged-shaped spokes defining in part a plurality of outlet channels. The pneumatic conveying system further includes a motor disposed on a distribution lines side of the distributor, and a shaft assembly rotatable by the motor and including an agitator portion substantially disposed on a supply line side of the distributor. The shaft assembly extends through an aperture of the distributor. The applicator further includes a metering system operably connected between the supply compartment and the pneumatic conveying system. The metering system meters product with the airflow to result in a mixed flow of airflow and product.

Numerous additional objects, aspects, and advantages of the present invention will be made apparent from the following detailed description taken together with the drawing figures.

BRIEF DESCRIPTION OF THE DRAWINGS

Preferred exemplary embodiments of the invention are illustrated in the accompanying drawings in which like reference numerals represent like parts throughout. In the drawings.

DETAILED DESCRIPTION OF THE INVENTION

Figure 1:
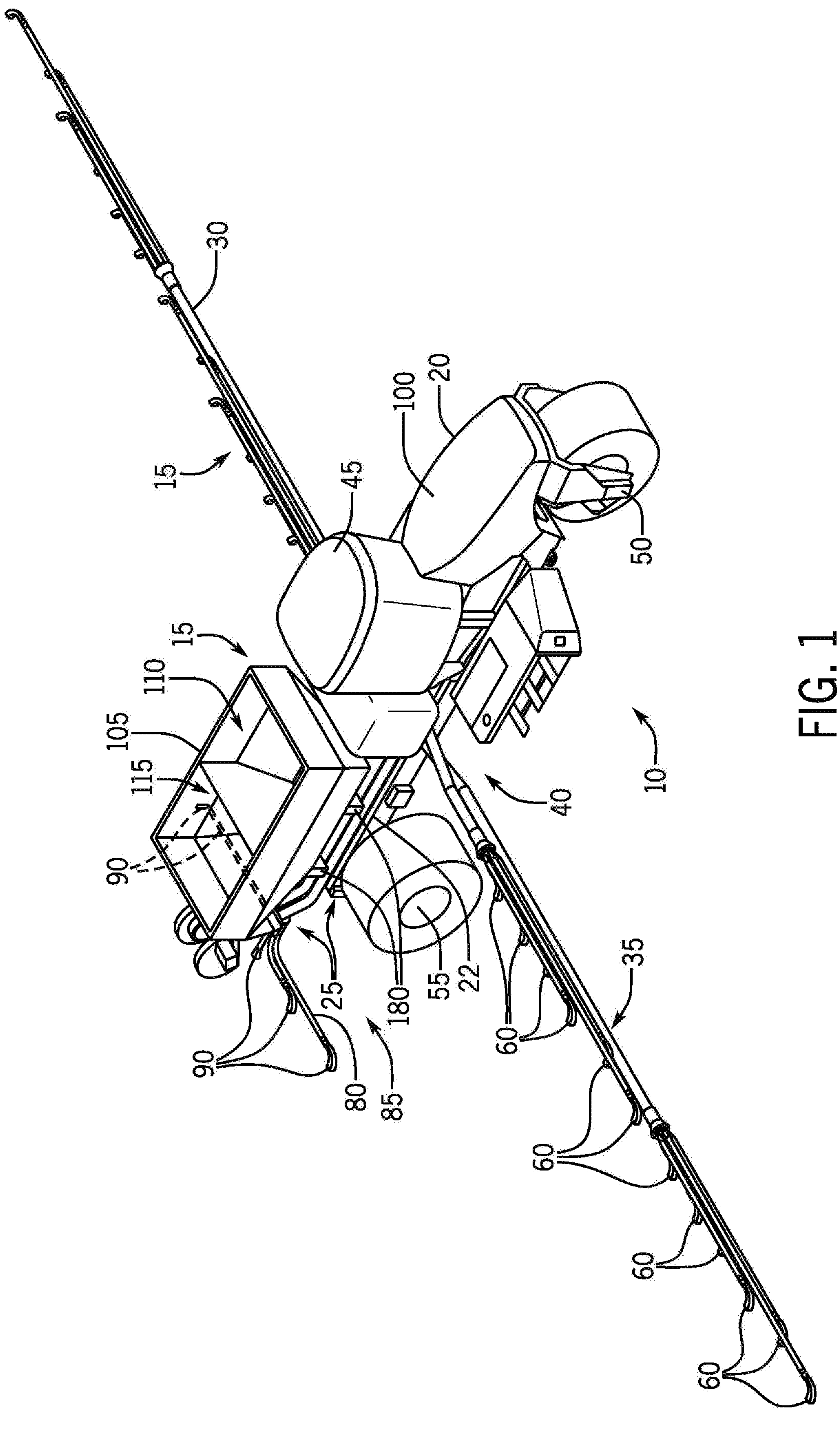
FIG. 1 is a isometric view of an agricultural application implement having a pneumatic conveying system according to one exemplary embodiment of the invention.

An agricultural application implement 10 (or simply implement 10) incorporating aspects of the invention is shown in FIG. 1. In the exemplary embodiment shown, the implement 10 includes an agricultural product delivery applicator 15 (or simply applicator 15), which is shown as a granular fertilizer applicator. As is known in the art, the implement 10 generally includes a transport unit 20, such as a truck, tractor, or trailer. The transport unit 20 can be formed integrally with or separately from the applicator 15. The applicator 15 includes a pneumatic conveying system 25 (or simply system 25).

The applicator 15 includes left and right laterally extending booms 30 and 35, respectively, extending at a mid-implement location 40. Left and right are referred to herein as viewed by the operator housed in the operator cab 45. The mid-implement location 40 refers to a mounting of the booms 30 and 35 between the front and rear axles 50 and 55, respectively, of the transport unit 20. The laterally extending booms 30 and 35 include a support structure (not shown for simplicity) and can be pivoted to a stowed position close to the implement 10 for storage or transport. Each boom 30 and 35 includes a plurality of boom conduits or tubes (discussed further below) terminating at respective outboard ends in in the applicator 15. The outboard ends of the booms 30 and 35 include a spreading outlet or nozzle. In the exemplary embodiment shown, boom 35 includes twelve outlets 60.

The pneumatic conveying system 25 also includes a laterally extending offset boom 80. The offset boom 80, which may also be referred to as a secondary boom, is mounted at a rearward location 85. The rearward location 85 refers to a mount of the offset boom 80 behind the rear axis 55. The offset boom includes six rear outlets 90. The offset boom 80 in combination with the booms 30 and 35 provide complete coverage across the width of applicator 15.

The shown transport unit 20 is self-propelled by an engine in an engine compartment 100 and includes the operator cab 45. For the shown construction, an uncovered tank 105 includes compartments 110 and 115 for carrying particulate material to be distributed to and disbursed by the outlets 60 and 90. One of the compartments, e.g., compartment 115, can be provided to supply micro-nutrients or other materials. The supply of particulate material in compartments 110 and 115 can be replenished periodically.

Before proceeding, some aspects of the applicator 15 can be a matter of design choice to someone skilled in the art. For example, the number, arrangement, and design of the compartments 110 and 115 and outlets 60 and 90 can vary. The applicator 15 is illustrative of the types of equipment on which the pneumatic conveying system 100 can be used; however, it should be understood that the pneumatic conveying system 100 may, of course, be employed in conjunction with other agricultural equipment such as tillage, seeding, or planting devices and is useful in distributing particulate material other than fertilizer.

Figure 2:
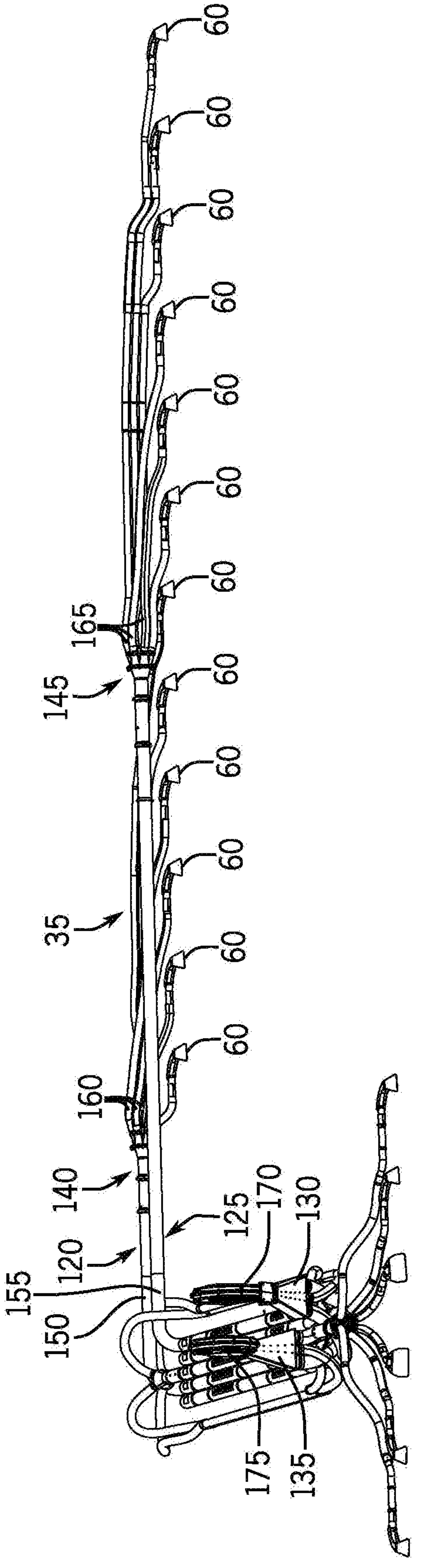
FIG. 2 is a partially broken away isometric view of a portion of the pneumatic conveying system of the implement of FIG. 1.
Figure 3:
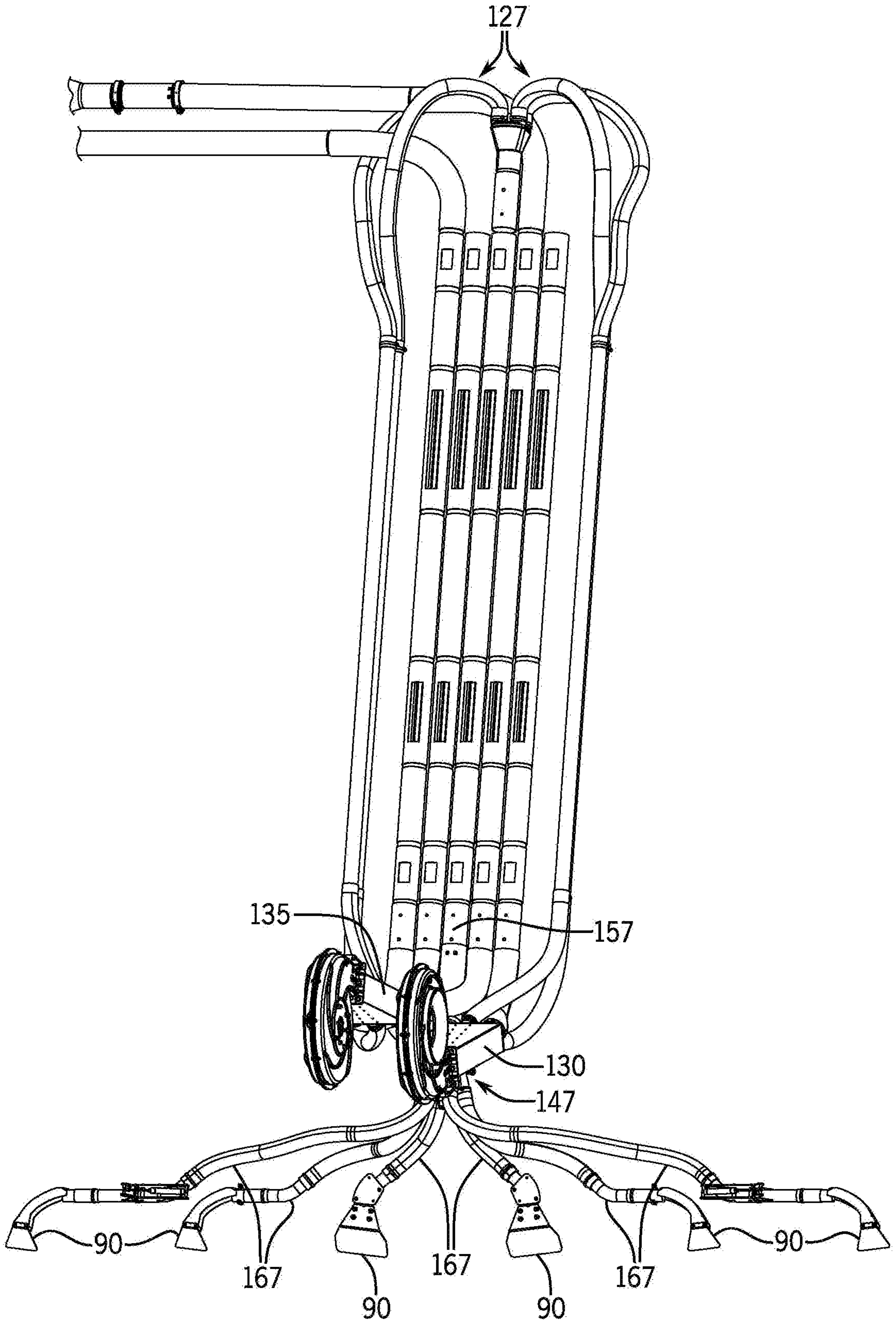
FIG. 3 is a partially broken away isometric view of a second portion of the pneumatic conveying system of the implement of FIG. 1.

The shown construction includes compartments 110 and 115 of the tank 105 being disposed above portions of the pneumatic conveying system 25. FIG. 2 shows a portion of the system 25 delivering to the right laterally extending boom 35. A portion of the pneumatic conveying system 25 delivering to the left laterally extending boom 30 is similar to, but symmetrically opposite from, the portion shown in FIG. 2, and consequently is not shown in detail. FIG. 3 shows a portion of the pneumatic conveying system 25 delivering to the offset boom 80 of FIG. 1. With reference to FIGS. 2 and 3, the system 25 includes delivery lines 120, 125, and 127 that extend from a plenum 130 and 135 at one end, and terminate at the outlets 60 and 90 at the other end. Through the delivery lines 120, 125, or 127, the fluid and the product are transported therein and are to be split by a distributor assembly 140, 145, or 147. The distributor assembly 140, 145, or 147 divides or distributes a fluid-particulate combination from a supply line 150, 155, or 157 into a number of smaller distribution lines 160, 1165, or 167 that are connected to the outlets 60 and 90.

To collect and drive the particulate material along the delivery lines 120, 125 and 127, are one or more pressurized air flow sources. For the shown construction, blowers 170 and 175 are operably connected to the plenums 130 and 135. The air flow from the blowers 160 and 165 is directed from the blowers 160 and 165 into the plenums 130 and 135, then the supply lines 150, 155, and 157, through the distributor assemblies 140, 145, and 147, into the distribution lines 160, 165, and 167, and out the outlets 60 and 90. As the airflow passes through the supply lines 150, 155, and 157, a metering system 180 (FIG. 1) entrains product from the compartments 1:10 and/or 115 into the airflow. The airflow and entrained product continues to flow along the delivery lines 120, 125, and 127 to the outlets 60 and 90.

Figure 4:
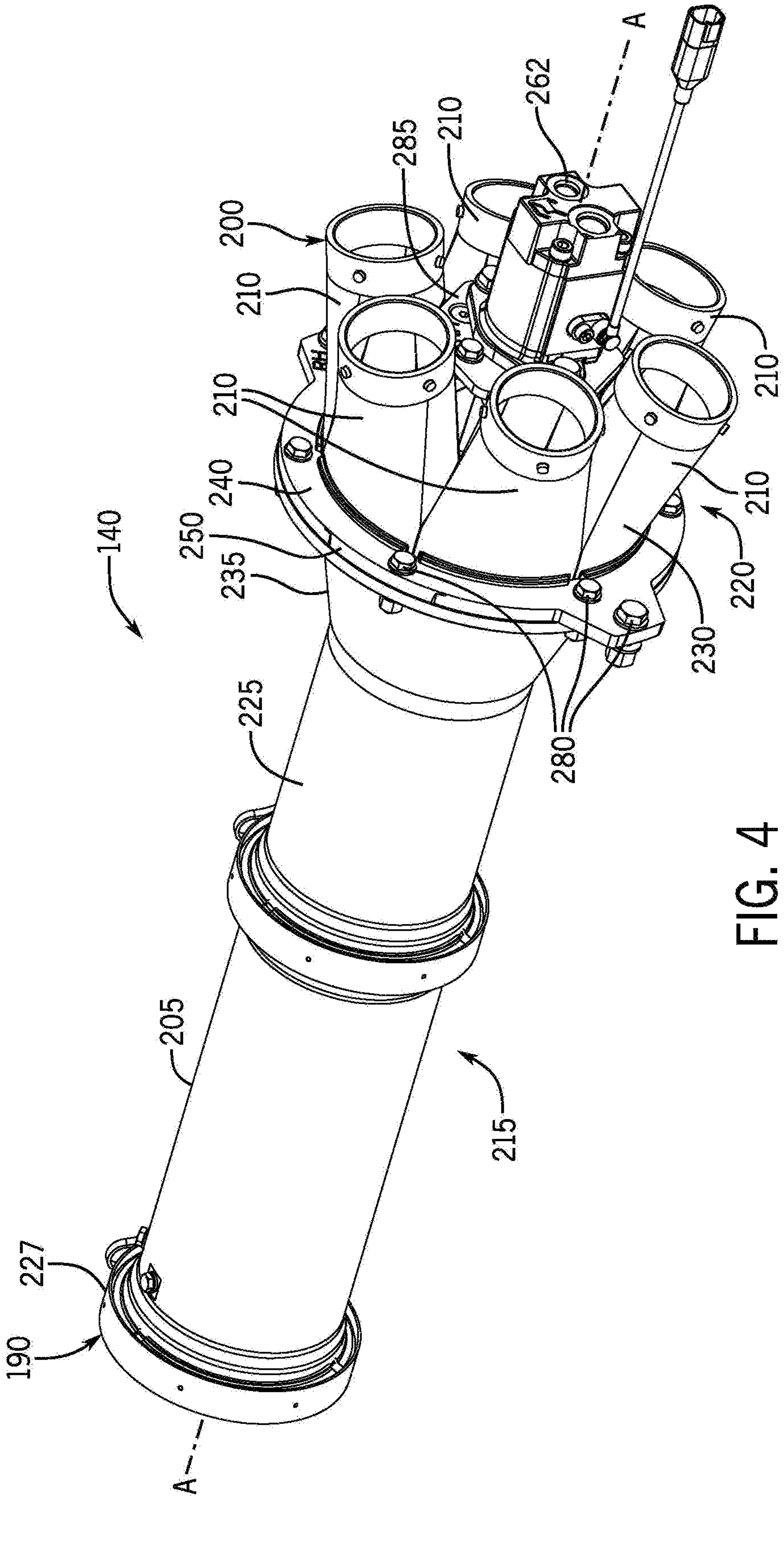
FIG. 4 is an isometric view of a rotary distributor assembly of the pneumatic conveying system of FIG. 2.

Referring now to FIG. 4, an exemplary construction of the distributor assembly 140 is illustrated. The supply line 157 (FIG. 3) is connected to one end 190 of the distributor assembly 140 and the distribution lines 160 are each connected to the opposite end 200 of the distributor assembly 140. The generally tubular-shaped housing 205 is oriented in an in-line position with regard to the supply line 150, such that the housing 205 for the distributor assembly 140 is positioned generally horizontal on the boom 30. The generally tubular-shaped housings 210 are oriented in an in-line position with regard to the distribution lines 160.

The distributor assembly 140, as shown in FIG. 4, includes a forward section 215 and a rearward section 220. The forward section 215 includes an elongate portion 225 of the housing 205 that is engaged with the end of the supply line 150 in order to affix the housing 205 to the supply line 150 in a suitable manner. In the illustrated embodiment, the elongate portion 225 has an inner diameter greater than that of the supply line 150 such that the supply line 150 can be inserted within the elongate portion 225 and secured thereto, e.g., with a clamp 227. The housings 210 includes elongated portions 230, which engage with the end of the distributor lines 190 in order to affix the housings 210 to the distributor lines 160 (FIG. 2) in a suitable manner; e.g., with clamps.

Opposite the supply line 150, the elongate portion 225 is connected to or integrally formed with a conical portion 235. The conical portion 235 expands radially outwardly from the elongate portion 225 to allow the particulate material entering the conical portion 235 from the elongate portion 225 to move radially outwardly from the center axis A-A of the housing 205. The conical portion 235 is connected to the distributor 240, such as by fasteners 280 engaged within aligned holes in aligned radial flange 250 formed by the distributor 240.

Figure 5:
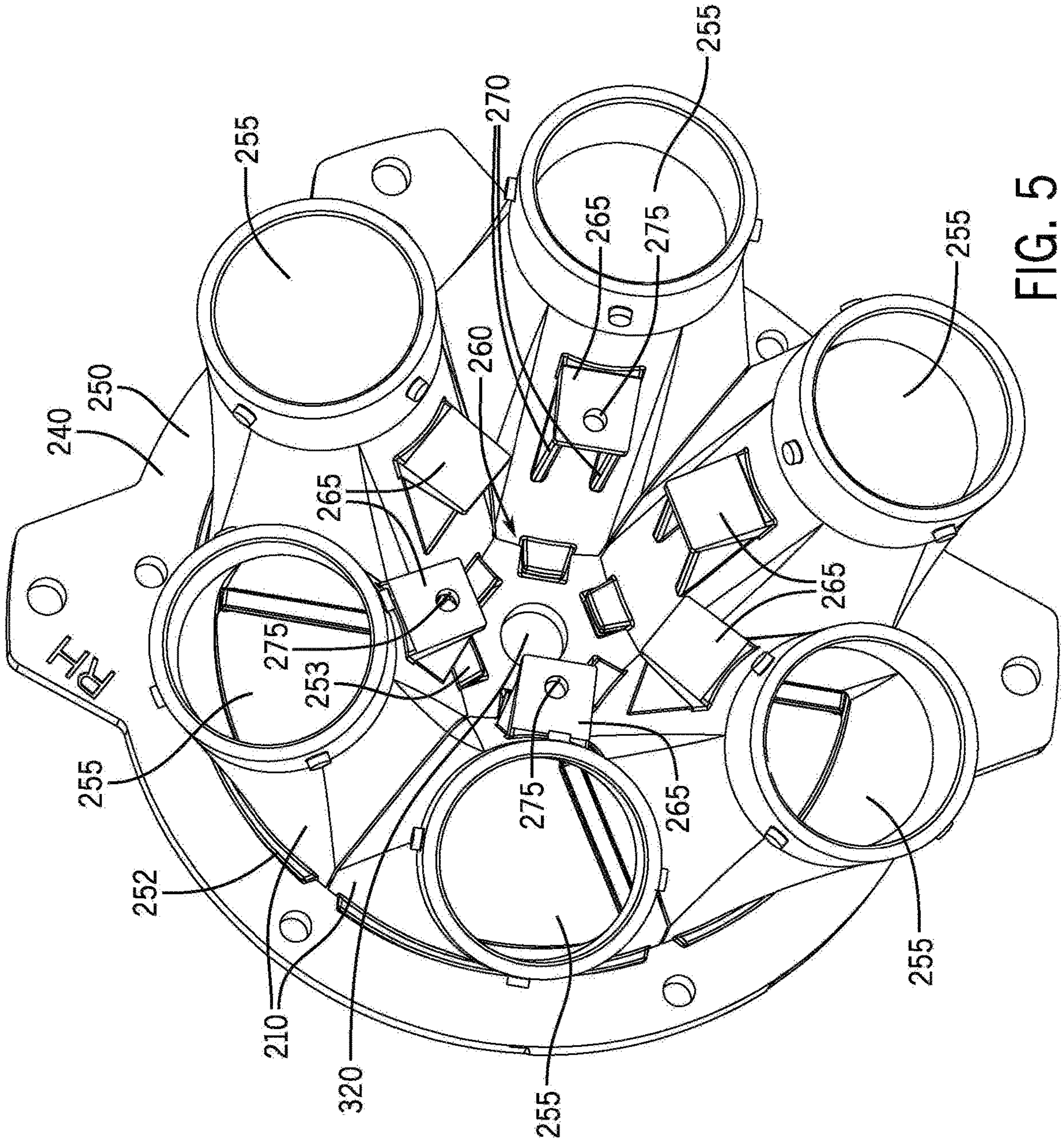
FIG. 5 is an isometric view of a distributor, housing, and outlet channels of the rotary distributor assembly of FIG. 4.

Referring now to FIG. 5, the housings 210 are coupled to the distributor 240 and provide distributor outlets for the distributor. In the shown construction, the housings are fastened by tabs 252 and inserts 253. However, in other constructions, the housings 210 can be integrally formed with the distributor 240. The housings 210 surround outlet channels 255. The housings 210 are spaced from one another on the rearward section 220 and extend outwardly at slight angles with regard to the center axis A-A.

The housings 210 surround a space 260 outside the exterior of the distributor 240 in the rearward section 230. A motor 262 (FIG. 4) is disposed in the space 260.

In the shown construction, each elongated portion 230 includes a respective motor attachment, which is shown as a mount, and more specifically a mounting flange 265. While each elongated portion 230 includes the mounting flange 265, not all of the mounting flanges 265 are necessary. Each mount also include one or more respective fins 270 (two are shown) for providing stability and support to the mounting flanges 265. The motor 262 can be mounted directly to the mounting flanges 265 such as by fasteners 280 (FIG. 7) engaged within aligned holes 275 in aligned mounting flanges 265. Additionally and as discussed in more detail below, a mounting plate 285 (FIG. 4) can be utilized in-between the motor 262 and the mounting flanges 265 with the fasteners 280 being further disposed through align holes 290 (FIG. 7) of the mounting plate 285. The distributor assembly 140 agitates and churns the product to disburse it evenly throughout the cross section of the larger supply tube. The product is then fed into the distributor 240 for equal disbursement into six smaller tubes. The smaller tubes, i.e., the distributions lines 160, carry the product down the length of the right laterally extending boom 30 to the outlets 60 for release from the boom 30 to the ground.

Figure 6:
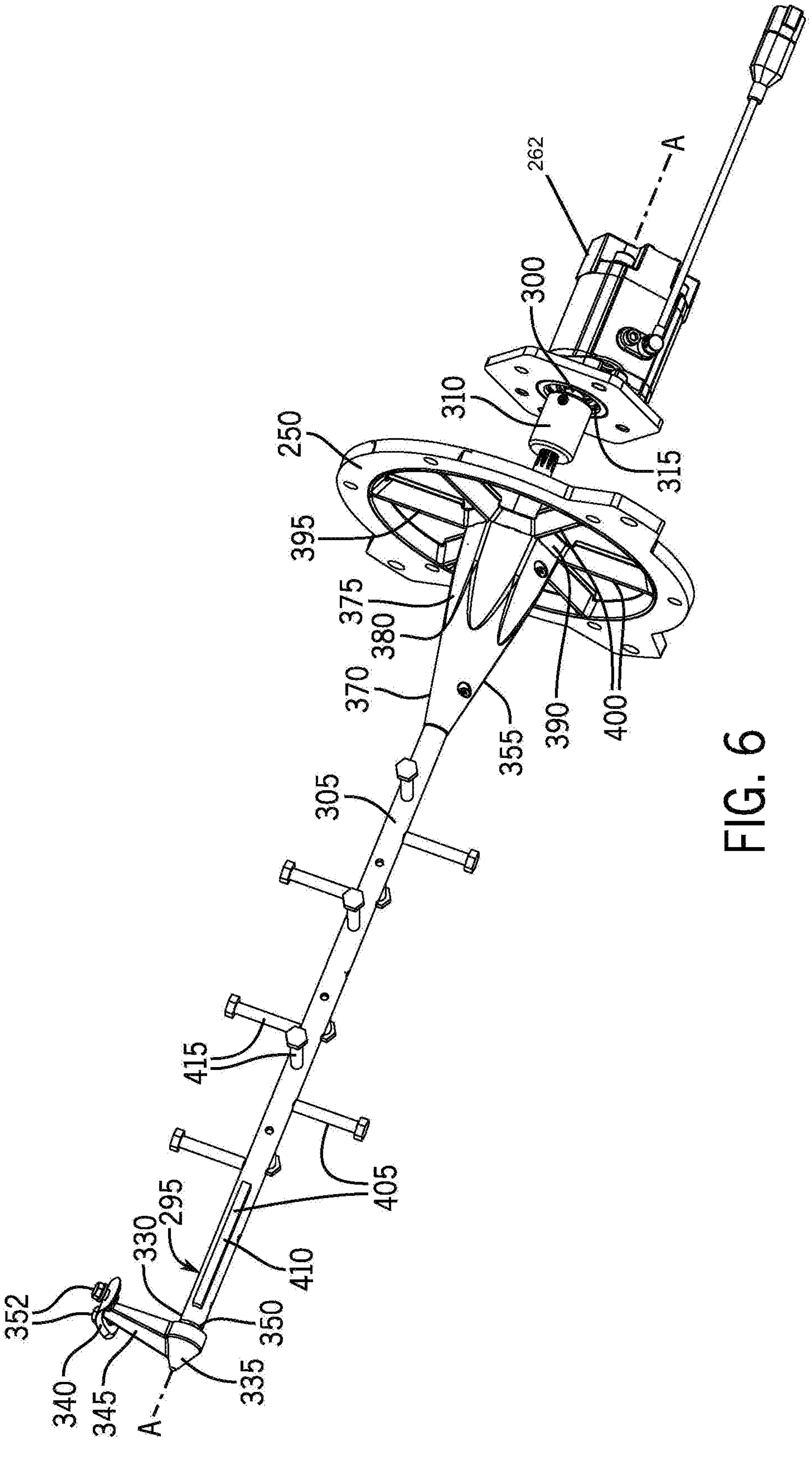
FIG. 6 is a partially broken away isometric view of a portion of the rotary distributor assembly of FIG. 4.

The motor 262 can be an electric motor, hydraulic motor, or other suitable type of motor. The motor 262, as shown in FIG. 6, includes a shaft assembly 295 (or simply “shaft” 295) having a motor shaft 300, an agitator shaft 305, and a coupler 310 coupling the motor shaft 300 and the auger shaft 305. The shaft 295 extends through a central aperture 315 of the mounting plate 285, a central aperture 320 (FIG. 5) of the distributor 240, and a central aperture of a deflector (discussed further below). The shaft 295 is aligned with the center axis A-A. An end 330 of the shaft 295 is received by a bearing secured to the housing 205 (FIG. 4). The shown bearing is a hanger bearing 335 having an arcuate portion 340, a spoke portion 345 extending from the arcuate portion 340, and a bearing portion 350 at the end of the spoke portion 345. Other constructions for the hanger bearing 335 are envisioned. For example, the spoke portion 345 can include a plurality of spokes, the arcuate portion 340 can consist up to a full circle, and the bearing portion 350 can include an aperture for the shaft to extend through. The shown bearing portion 350 includes a cone end to promote flow around the bearing portion 350. The hanger bearing 335 can be a cast part. The arcuate portion 340 can be secured to the housing 205 or integrated with the housing 205. The shown hanger bearing 335 is secured to the housing with fasteners 352.

Figure 7:
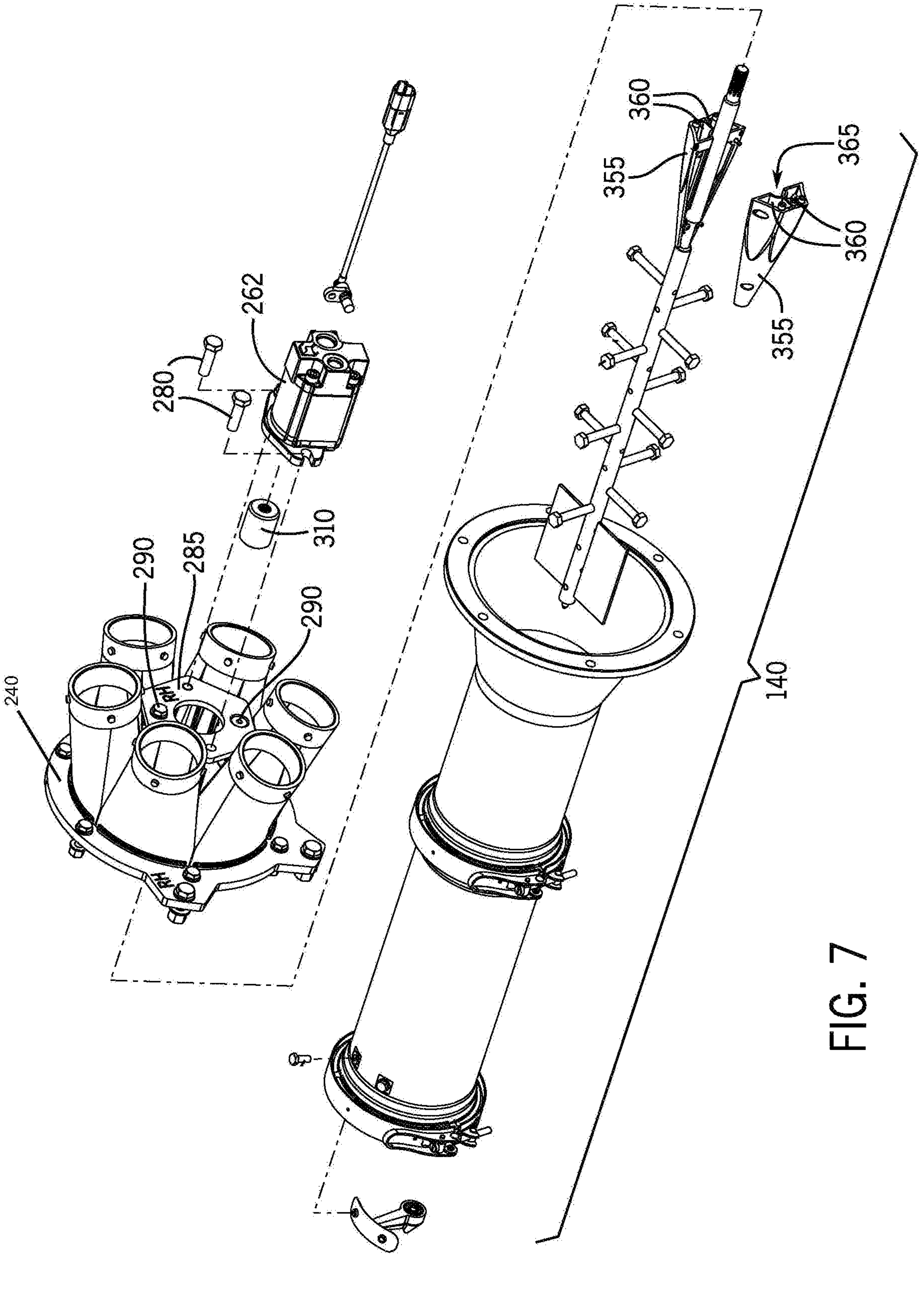
FIG. 7 is a partial exploded view of the rotary distributor assembly of FIG. 4.

With reference to FIGS. 6 and 7, the deflector 355 is attached to the distributor 240 by fasteners extending through the distributor 240 and into bores 360 of the deflector. The shown deflector 355 consists of two halves fastened together. The deflector includes the central aperture 365 for the shaft 295 to extend and rotate through. The deflector 355 can include a bearing for helping to support rotational movement of the shaft 295. In some constructions, the deflector 355 can be integrally formed with the distributor 240. The deflector 355 includes a conical portion 370 and a scallop portion 375. The conical portion 370 expands radially outwardly from the shaft 295 to help guide the particulate material away from the center axis A-A. The scallop portion 375 includes a scallop edge 380 that transitions from the conical portion to a non-conical or differing conical portion. The scallop edge 380 includes a plurality of arcuate shaped scallops. The number of arcuate shaped scallops correspond to the number of channels 255 in the distributor 240. The shown deflector 355 is stationary and has the scallop edge 380 and the scallops for transitioning product from the conical portion 235 to the channels 255.

For the shown construction, the distributor 240 includes the outer flange 250 (or rim), an inner hub 390 having the aperture 320 (FIG. 5), and spokes 395 coupling the outer flange 250 to the inner hub 390. The spokes 395 provide the start of the channels 255, and are in the shape of a wedge having an edge 400.

The agitator shaft 305 supports a number of agitators 405 thereon, where the agitators 405 are spaced along the agitator shaft 305 at different distances from the deflector 355 and at different angular positions on the agitator shaft 305. For the shown construction, the agitators are paddles 410 with staggered, helical rods 415 on a short-line version. However, other arrangements are possible, including arrangements as shown in US Patent Application Publication No. 20180343792 A1.

During use, product tends to cling to the inner wall of the housing 205 as pressure increases. The product should come off of the inner wall and into the air stream. As the product is pushed through the housing 205, the agitator shaft 305 helps to lift the product off the wall and back into the air stream. The agitator shaft 305 also chums or agitates the product for even disbursement into the distribution lines 160. Once into the air stream, the spinning agitator shaft 305 disperses the product. The agitator shaft 305 also helps assure that an even amount of product enters each channel 255.

Figure 8:
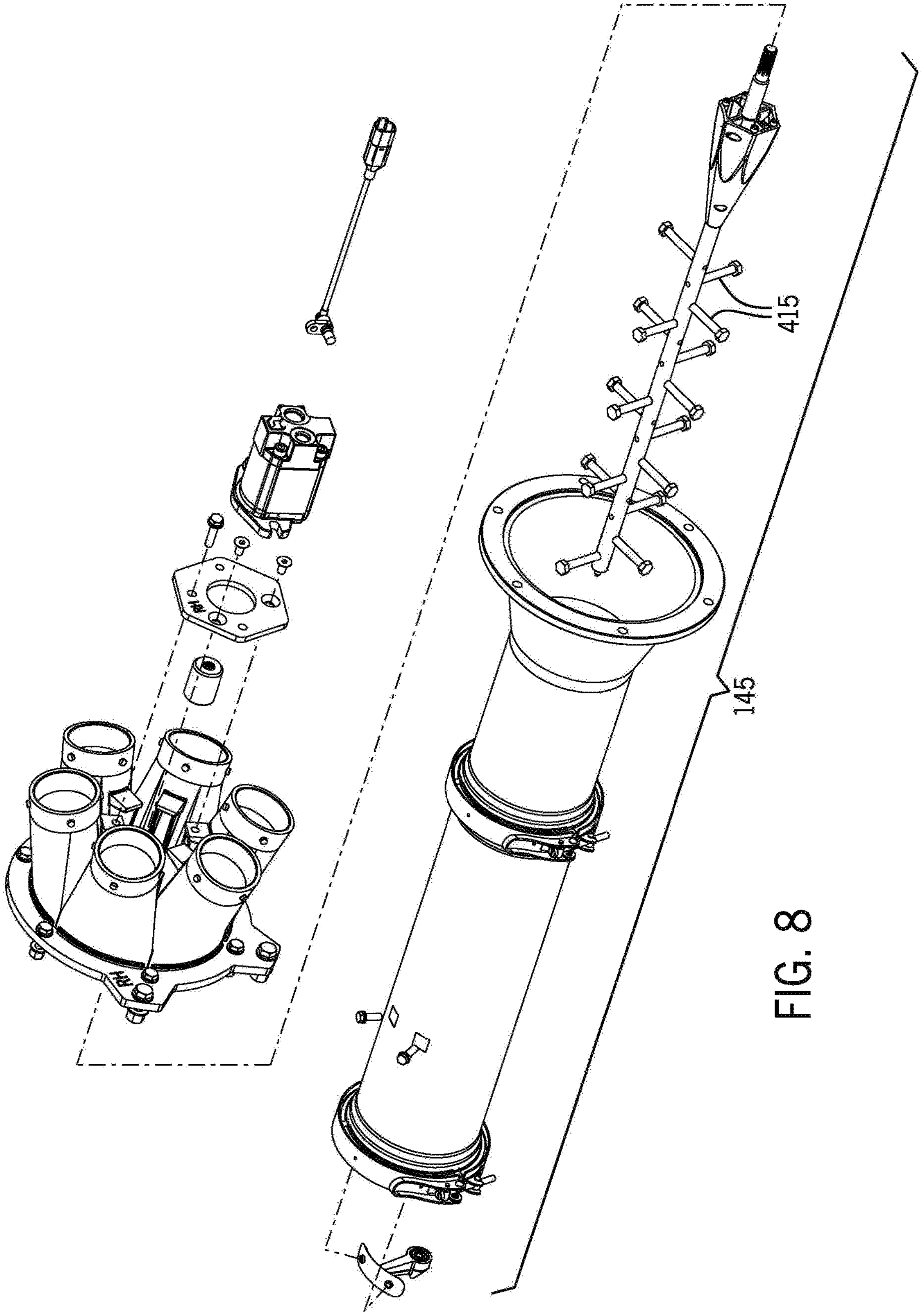
FIG. 8 is a partial exploded view of a second rotary distributor assembly of the pneumatic conveying system of FIG. 2.

A short line version 140 and long line version 145 of the distributor assembly is shown in FIGS. 7 and 8, respectively. The short line version 140 includes paddles 410 (or fins) for further promoting movement of the product in the short line version 140. The paddles 410, if present, start the disbursement of the product. The helical rods 415 help with dispersing the product appropriately into the multiple tubes at the appropriate weight for delivery.

The inclusion of the agitator shaft 305, deflector 355, and wedges 400 allow for an increase in the volume of product that can flow through the pneumatic conveying system 25 (discussed above with FIG. 1). Increasing the volume of product allows laterally extending booms 30 and 35 to increase in length from 70 to 90 feet; i.e., 10 feet in each direction.

In various constructions, the shaft assemblies 295, and consequently the motors 262, are required to spin in opposing directions for the left laterally extending boom 30 from the right laterally extending boom 35. Due to pressure drops, specific ports are designated for specific deflector locations on the laterally extending booms 30 or 35. Spinning in the opposing directions assures proper product disbursement to the correct ports on the distributor 240. The system uses two different hydraulic motors 262 and 262A (FIGS. 7 and 9) that spin in opposing directions. For one of the booms, motor rotation may be clockwise, while motor rotation may be counter clockwise for the other boom. It is envisioned that the differing hydraulic motors 262 and 262A can be accidently attached to the wrong arm. This can result in improper distribution of particulate material.

Figure 9:
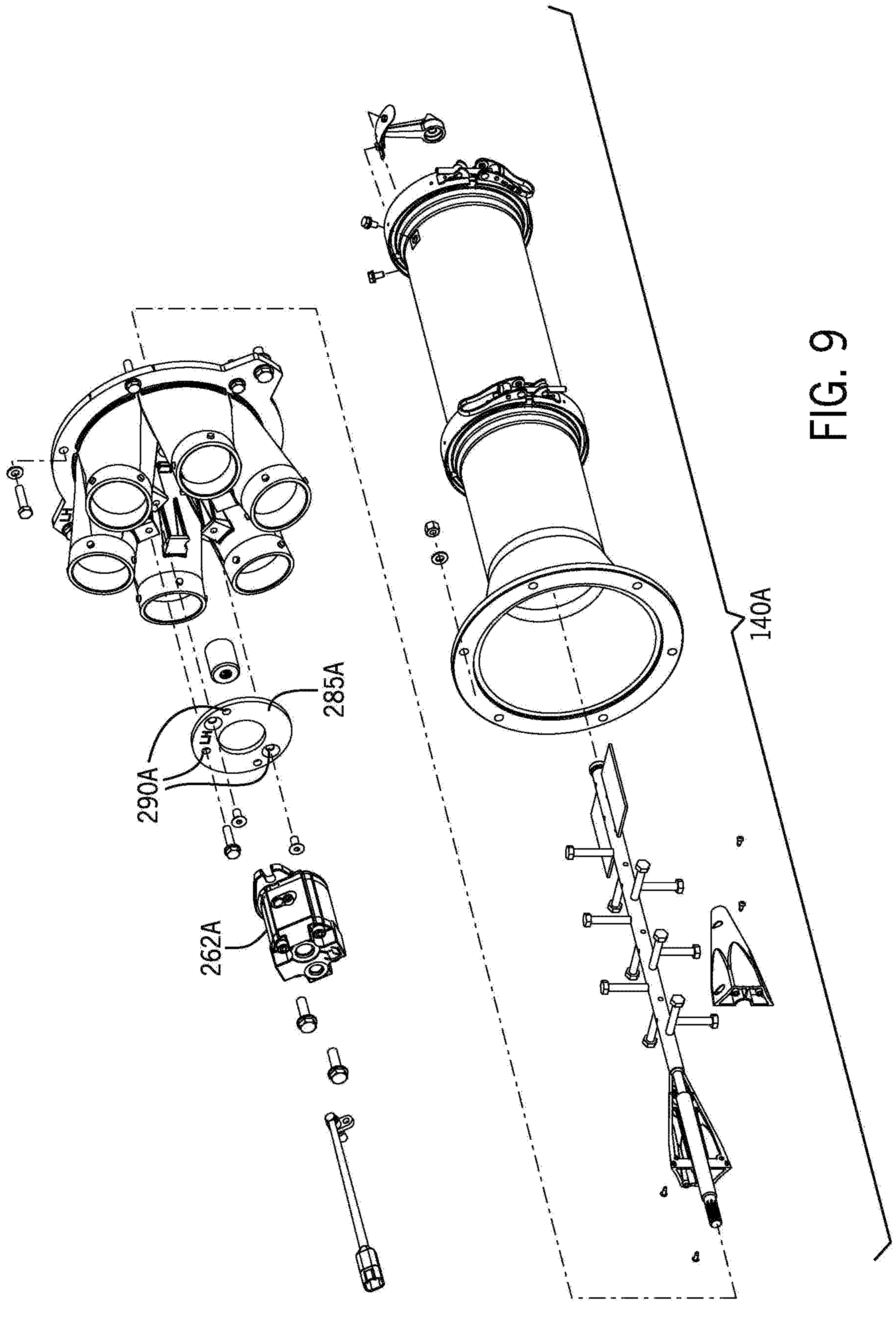
FIG. 9 is a partial exploded view of a third rotary distributor assembly of the pneumatic conveying system of FIG. 2.

For FIGS. 7 and 9, to help assure that the proper motor 262 and 262A is mounted to the correct laterally extending boom 30 or 35, the distributor assemblies 140 and 140A include mounting plates 285 and 285A having different shapes and aperture patterns (e.g., differing align holes 290 and 290A). Further, the left hand side is labeled with a first indicia or indicium (e.g., LH) and the right hand side is labeled a second, different indicia or indicium (e.g., RH). Moreover, it is envisioned that different coloring systems can also be used. For example, if a "LH" plate 285A is mounted to the "RH" side of the laterally extending boom 35, a brief inspection will indicate that the motor 262A has been mounted to the incorrect side of the boom.

Further for the shown constructions, a "LH" motor 262A cannot be mounted to a "RH" plate 285, and a "RH" motor 262 cannot be mounted to a "LH" plate 285A because the aperture configuration inhibits mounting the wrong motor. This may reduce errors in assembly and reduce potential improper particulate material distribution from errors in the assembly. Extending the above, indicium and color coordination can be used on all of the distributor 240 and 240A, mounting plate 285 and 285A, and motor 262 and 262A. This allows assemblers to know which assembly goes on which side of the applicator 20; and it also provides "tells" for inspectors to readily detect an incorrect assembly of the components.

In operation, material is metered by the metering system 180 into the channel of the supply line 150, 155, and 157. A fluid or airflow is also provided to the supply line 150, 155, and 157 by the blowers 170 and 175. The pneumatic conveying system 25 controls both the metering system 180 and the airflow to result in a desired mixture. The mixture is directed into the housing 205 of the distributor assembly 140, 145, and 147. The motor 162 is operated to rotate the shaft assembly 295. The speed of the shaft 295 can be varied as desired by the system 25. The rotation of the shaft 295 causes the agitators 405 to rotate within the housing 205, with the agitators 405 contacting the incoming particulate material. The contact of the agitators 405 with the particulate material causes the particulate material to be deflected into the channels 255 of the distribution lines 160, 165, and 167. The deflector 355, including the conical portion 370 and the scallop portion 375, assist with deflecting the mixture into the channels 255. Upon entering the channels 250, the particulate materials are directed into the distribution lines 160, 165, and 167 for direction and dispensing by the outlets 60 and 90.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

What is claimed is:

1. An agricultural product delivery applicator for delivering particulate product to a field, the applicator comprising:

- a supply compartment to hold the product;
- a pneumatic conveying system comprising:
  - an airflow source to provide an airflow;
  - a delivery line operably connected to the airflow source and to the supply compartment, the delivery line including a supply line and a plurality of distribution lines;
  - a distributor coupling the supply line with the plurality of distribution lines, the distributor having an aperture;
  - a plurality of distributor outlets providing outlet channels for the distributor, each one of the plurality of distributor outlets coupled to a respective one of the plurality of distribution lines;
  - a motor mount disposed away from the aperture along an axis and supported by one or more of the plurality of distributor outlets;
  - a motor disposed on a delivery lines side of the distributor and fastened to the motor mount;
  - a shaft assembly rotatable by the motor and including an agitator portion substantially disposed on a supply line side of the distributor, the shaft assembly extending through the aperture of the distributor; and
- a metering system operably connected between the supply compartment and the pneumatic conveying system, the metering system to meter product with the airflow to result in a mixed flow of airflow and product.

2. The applicator of claim 1, wherein the pneumatic conveying system includes a distributor assembly comprising the distributor, the plurality of distributor outlets, the motor mount, the motor, and the shaft assembly.

3. The applicator of claim 1, wherein the plurality of distributor outlets is integrally formed with the distributor.

4. The applicator of claim 1, wherein the motor mount is integrally formed with the one or more of the plurality of distributor outlets.

5. The applicator of claim 1, wherein the motor mount includes a support fin.

6. The applicator of claim 1, wherein the motor mount includes a plurality of mounting platforms, and wherein each one of the plurality of mounting platforms is supported by a respective one of the plurality of distribution lines.

7. The applicator of claim 6, wherein at least two of the plurality of mounting platforms include an aperture for a fastener and at least one of the plurality of mounting platforms does not include an aperture for a fastener.

8. The applicator of claim 1, wherein the distributor includes wedged-shaped spokes defining in part the outlet channels.

9. The applicator of claim 1, wherein the distributor assembly further comprises a deflector on the supply line side of the distributor.

10. The applicator of claim 9, wherein the deflector is fastened to the distributor and includes an aperture, wherein the shaft assembly extends through the aperture of the distributor.

11. The applicator of claim 1, wherein the distributor assembly further comprises a mounting plate coupled to the motor mount, and wherein the motor is fastened to the motor mount via the mounting plate.

12. An agricultural product delivery applicator for delivering particulate product to a field, the applicator comprising:

- a supply compartment to hold the product;
- a pneumatic conveying system comprising:
  - an airflow source to provide an airflow;
  - a delivery line operably connected to the airflow source and to the supply compartment, the delivery line including a supply line and a plurality of distribution lines;

a distributor coupling the supply line with the plurality of distribution lines, the distributor including a plurality of wedged-shaped spokes defining in part a plurality of outlet channels;

a motor mount disposed away from the aperture along an axis and supported by one or more of the plurality of distributor outlets;

a motor disposed on a distribution lines side of the distributor and fastened to the motor mount;

a shaft assembly rotatable by the motor and including an agitator portion substantially disposed on a supply line side of the distributor, the shaft assembly extending through an aperture of the distributor; and a metering system operably connected between the supply compartment and the pneumatic conveying system, the metering system to meter product with the airflow to result in a mixed flow of airflow and product for the plurality of outlets.

13. The applicator of claim 12, wherein the pneumatic conveying system includes a distributor assembly comprising the distributor, the motor, the motor mount, and the shaft assembly.

14. The applicator of claim 12, wherein the plurality of distributor outlets is integrally formed with the distributor.

15. The applicator of claim 12, wherein the motor mount is integrally formed with the one or more of the plurality of distributor outlets.

16. The applicator of claim 12, wherein the distributor assembly further comprises a deflector on the supply line side of the distributor.

17. The applicator of claim 16, wherein the deflector is fastened to the distributor and includes an aperture, wherein the shaft assembly extends through the aperture of the distributor.

18. The applicator of claim 12, wherein the distributor assembly further comprises a mounting plate coupled to the motor mount, and wherein the motor is fastened to the mounter mount via the mounting plate.

19. An agricultural product delivery applicator for delivering particulate product to a field, the applicator comprising:

a supply compartment to hold the product;

a pneumatic conveying system comprising:

an airflow source to provide an airflow;

a delivery line operably connected to the airflow source and to the supply compartment, the delivery line including a supply line and a plurality of distribution lines;

a distributor coupling the supply line with the plurality of distribution lines, the distributor having an aperture, the distributor including a plurality of wedged-shaped spokes defining in part a plurality of outlet channels;

a plurality of distributor outlets providing outlet channels for the distributor, each one of the plurality of distributor outlets coupled to a respective one of the plurality of distribution lines;

a motor mount disposed away from the aperture along an axis and supported by one or more of the plurality of distributor outlets;

a motor disposed on a delivery lines side of the distributor and fastened to the motor mount;

a shaft assembly rotatable by the motor and including an agitator portion substantially disposed on a supply line side of the distributor, the shaft assembly extending through the aperture of the distributor; and a metering system operably connected between the supply compartment and the pneumatic conveying system, the metering system to meter product with the airflow to result in a mixed flow of airflow and product.

20. The applicator of claim 19, wherein the motor mount includes a plurality of mounting platforms, wherein each one of the plurality of mounting platforms is supported by a respective one of the plurality of distribution lines, and wherein at least two of the plurality of mounting platforms include an aperture for a fastener and at least one of the plurality of mounting platforms does not include an aperture for a fastener.

* * * * *